US008384756B2

United States Patent
Goffin, II

(10) Patent No.: US 8,384,756 B2
(45) Date of Patent: Feb. 26, 2013

(54) VIDEO TELEPHONY DEVICE HAVING FUNCTIONALITY TO MUTE INCOMING MESSAGES THAT ARE BEING RECORDED

(75) Inventor: Glen P. Goffin, II, Dublin, PA (US)

(73) Assignee: General Instrument Corporation, Horsham, PA (US)

( * ) Notice: Subject to any disclaimer, the term of this patent is extended or adjusted under 35 U.S.C. 154(b) by 960 days.

(21) Appl. No.: 12/345,731

(22) Filed: Dec. 30, 2008

(65) Prior Publication Data

US 2010/0165070 A1  Jul. 1, 2010

(51) Int. Cl.
*H04N 7/14* (2006.01)

(52) U.S. Cl. ............... 348/14.06; 348/14.01; 348/14.03; 379/70; 379/142.08

(58) Field of Classification Search .... 348/14.01–14.16; 379/67.1, 142.08, 201.01, 209.01, 88.02, 379/88.19, 88.35, 68, 70
See application file for complete search history.

(56) References Cited

U.S. PATENT DOCUMENTS

| 5,894,504 A * | 4/1999 | Alfred et al. ............... 379/88.13 |
| 6,393,106 B1 | 5/2002 | Cannon et al. |
| 6,667,759 B2 | 12/2003 | Gerszberg et al. |
| 7,042,871 B2 | 5/2006 | Gallant et al. |
| 7,127,045 B1 | 10/2006 | Yoon et al. |
| 7,162,013 B2 | 1/2007 | Gavette et al. |
| 7,417,982 B2 | 8/2008 | Jain et al. |
| 2002/0015091 A1* | 2/2002 | Honguu et al. ............ 348/14.06 |
| 2005/0073574 A1 | 4/2005 | Krisbergh et al. |
| 2005/0180553 A1 | 8/2005 | Moore |
| 2007/0002775 A1 | 1/2007 | Belling |
| 2007/0058537 A1 | 3/2007 | Belling |
| 2007/0081518 A1 | 4/2007 | Jain et al. |
| 2007/0139514 A1* | 6/2007 | Marley ..................... 348/14.01 |
| 2007/0211139 A1* | 9/2007 | Makise ..................... 348/14.01 |
| 2007/0294411 A1 | 12/2007 | Hakkarainen |
| 2008/0056465 A1 | 3/2008 | Ruckart |
| 2008/0075262 A1 | 3/2008 | Wood et al. |
| 2008/0159488 A1 | 7/2008 | Raja |
| 2008/0212594 A1 | 9/2008 | Shaikh et al. |
| 2008/0244610 A1 | 10/2008 | Zhang et al. |
| 2008/0259909 A1 | 10/2008 | Runeson et al. |
| 2008/0270618 A1 | 10/2008 | Rosenberg |

\* cited by examiner

*Primary Examiner* — Melur Ramakrishnaiah
(74) *Attorney, Agent, or Firm* — Stewart M. Wiener

(57) ABSTRACT

A method of responding to an incoming call includes receiving the incoming call from a caller. The incoming call includes caller ID information having image data associated with the caller included therein. The image data is displayed on a video telephony device display while audibly announcing receipt of the incoming call. A communication session is established with the caller by presenting a pre-recorded announcement to the caller. In response to the pre-recorded announcement, a message from the caller is received and recorded. The message is rendered while it is being recorded only if a user-selectable mute setting option has not been activated.

19 Claims, 3 Drawing Sheets

VIDEO TELEPHONY DEVICE HAVING FUNCTIONALITY TO MUTE INCOMING MESSAGES THAT ARE BEING RECORDED

FIELD OF THE INVENTION

The present invention relates generally to video telephony devices and more particularly to a video telephony device that includes caller ID and answering machine capabilities.

BACKGROUND OF THE INVENTION

Telephony systems allowing voice communications between remote users have been available for many years, and provide a common means of communication. Communications systems that provide video capabilities have also been developed. For example, video telephony devices that allow voice and video data to be transmitted using conventional telephone lines have been developed. Furthermore, with the arrival of high speed Internet connections, video telephony devices using Internet Protocol (IP) communication channels have been developed.

In recent years a growing number of telephone services have become available to users of telephone services. Such services include, for example, call forwarding, call waiting, conferencing, and caller identification. Caller identification, or Caller ID, has become particularly popular as it allows called parties a certain degree of call screening prior to answering a call. In a typical case, the called party's telephone has a caller ID screen or a stand-alone caller ID device to which it is attached. When the called party receives a call, caller identification information concerning the calling party, including the date and time of the call, and often the name and number of the calling party, is displayed on the screen of the called party's caller ID device.

Once the called party has received the Caller ID information, an additional degree of screening may be performed if the caller's phone is equipped with an answering system that records messages left by a caller. In this case the called party can listen to a caller's message as it is being recorded before deciding whether to answer the call.

Conventional caller ID functions generally provide the phone number and name of the calling party. A video telephony device, however, in addition to providing conventional caller ID functions, can provide an image (still or video) related to the incoming call. For example, the image presented by the calling video telephony device can be a live or recorded image showing the calling party. Alternatively, the image can be a business logo, or other type of image that is selected by the calling party or even by the called party. The image can consist of a single frame of information or a multi-frame, multimedia presentation. In any case, the image or images can be displayed on the receiving party's phone.

Thus, when the caller and called party both have a video telephony device, and in particular when the called party's video telephony device is equipped with an answering machine, the called party may perform call screening in a number of different ways. For instance, the called party may read the name and number of the caller off the display using the caller ID functionality. The called party may also view the image that is included with the caller ID information. Finally, the called party can listen to the message that the caller is leaving. The caller may select any or all of these options when performing call screening before deciding whether to answer the call.

SUMMARY OF THE INVENTION

In accordance with the present invention, a method of responding to an incoming call includes receiving the incoming call from a caller. The incoming call includes caller ID information having image data associated with the caller included therein. The image data is displayed on a video telephony device display while audibly announcing receipt of the incoming call. A communication session is established with the caller by presenting a pre-recorded announcement to the caller. In response to the pre-recorded announcement, a message from the caller is received and recorded. The message is rendered while it is being recorded only if a user-selectable mute setting option has not been activated.

In accordance with another aspect of the invention, a video telephony device is provided that includes an external communications interface for communicating information over an external communications network. The video telephony device also includes a display for presenting image data received over the external communications network, a speaker for rendering audio information received over the external communications network, and a telephone answering device for responding to an incoming call by presenting a pre-recorded announcement to a caller and recording a message from the caller. The video telephony device further includes a user interface. The user interface includes a menu of user-selectable settings. The user-selectable settings include a mute option to prevent the speaker from rendering the message from the caller while it is being recorded by the telephone answering device. A database is configured to store the user-selectable settings chosen by a user. A processor is operatively associated with the external communications interface, the display, the speaker, the telephone answering device, the user interface and the database.

DETAILED DESCRIPTION

Figure 1:
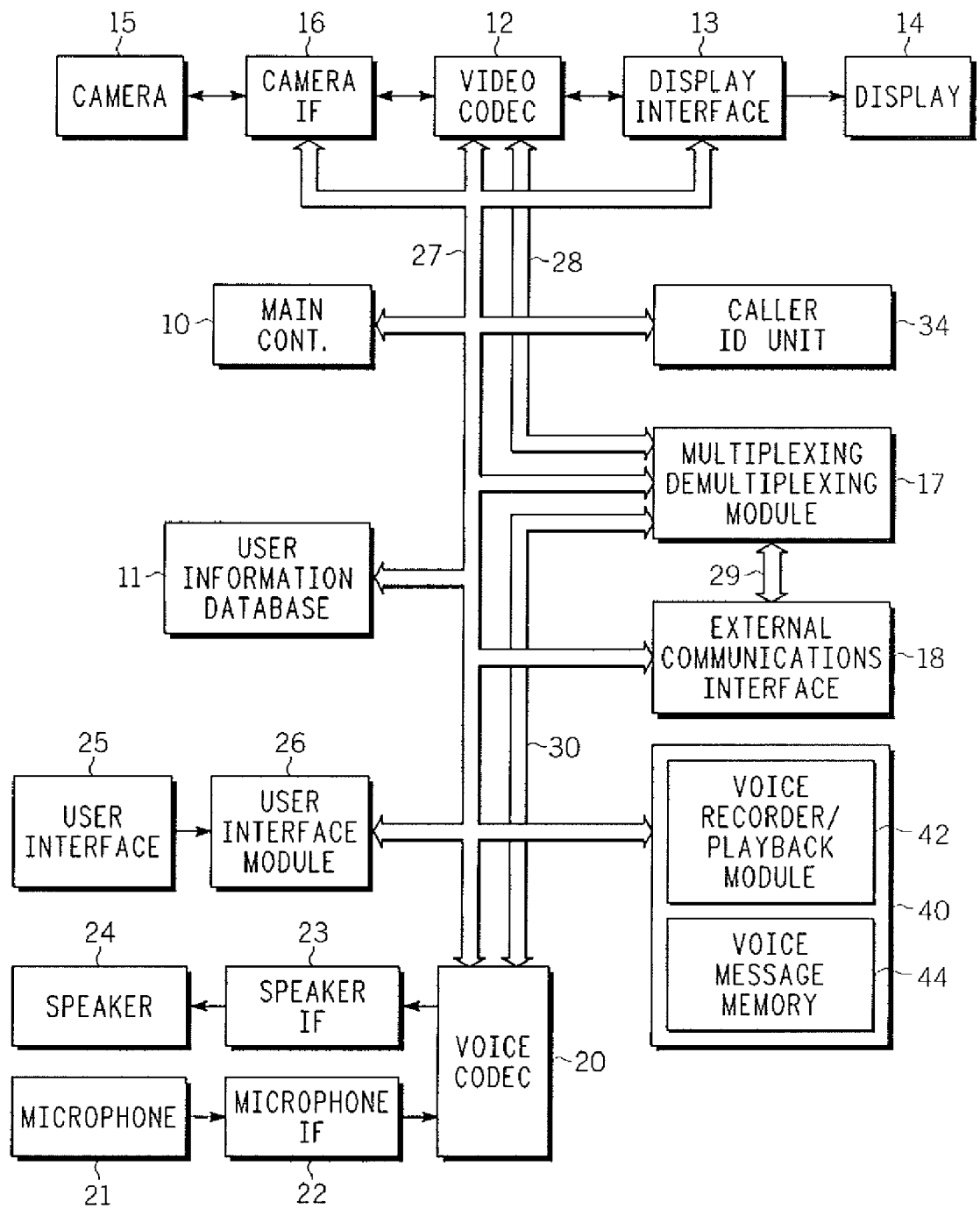
FIG. 1 shows a functional block diagram of a video telephony device in accordance with an embodiment of the invention.

As previously mentioned, a user of a video telephony device may perform call screening in a number of different ways. Given these various options, the user may wish to suppress any option that may, in some circumstances at least, prove to be intrusive. For instance, the audio that is rendered while a voice message is being left on an answering machine may interrupt other activities that the user may be performing at the time the call is received. Accordingly, in the system and method described herein, a called party is given the option of suppressing or muting the audio that would be rendered while a message from a calling party is being received and recorded. Despite the inactivation of this feature, the user can still effectively perform call screening since the caller ID information is still available, thereby providing the user with both the name and number of the calling party and an image associated with the calling party. As used herein, image may refer to a single frame (i.e., a still image) and/or video.

At the outset, it should be noted that the features and functionality discussed herein may be embodied in a video telephony device that can transmit and receive information over any of a variety of different external communication media supporting any type of service, including voice over broadband (VoBB) and legacy services. VoBB is defined herein to include voice over cable modem (VoCM), voice over DSL (VoDSL), voice over Internet protocol (VoIP), fixed wireless access (FWA), fiber to the home (FTTH), and voice over ATM (VoATM). Legacy services include the integrated service digital network (ISDN), plain old telephone service (POTS), cellular and 3G. Accordingly, the external communication medium may be a wireless network, a convention telephone network, a data network (e.g., the Internet), a cable modem system, a cellular network and the like. In this context a call is used generically to indicate any communications session supported within a set of protocols, and thus is not limited to conventional telephony services such as POTS.

Various industry standards have been evolving for video telephony services such as those promulgated by the International Telecommunications Union (ITU). The standards and protocols that are employed will depend on the external communication medium that is used to communicate the voice and audio information. For example, if the video telephony device employs a POTS service, protocols may be employed such as the CCITT H.261 specification for video compression and decompression and encoding and decoding, the CCITT H.221 specification for full duplex synchronized audio and motion video communication framing, the CCITT H.242 specification for call setup and disconnect. On the other hand, video telephony devices operating over the Internet can use protocols embodied in video conference standards such as H.323 as well as H.263 and H.264 for video encoding and G.723.1, G.711 and G.729 for audio encoding. Of course, any other appropriate standards and protocols may be employed. For example, IETF standards such as SIP, RTP/RTCP protocols may be employed.

FIG. 1 shows a functional block diagram of a video telephony device 100 in accordance with an embodiment of the invention. The functional elements depicted in FIG. 1 are applicable across the various telephony platforms and protocols mentioned above. That is, the video telephony device 100 may be, without limitation, an analog phone, ISDN phone, analog cellular phone, digital cellular phone, PHS phone, Internet telephone and so on. Of course, the implementation of each functional element and the standards and protocols employed will differ from platform to platform. The device 100 comprises a main controller 10, a personalized user information database 11, a video codec 12, a display interface 13, a display unit 14 such as an LCD, a camera 15, a camera interface 16, a multiplexing and demultiplexing module 17, an external communications interface 18, a voice codec 20, a microphone 21, a microphone interface 22, a speaker interface 23, a speaker 24, a user interface 25, a user interface control module 26, caller ID unit 34 and a telephone answering device (i.e., an answering machine) 40. The user interface 25 may be, for example, a telephone handset and/or other user interface components (e.g., a touchscreen) that allow the user to properly use the video telephony device 100.

Of these components, the main controller 10, the personalized user interface database 11, the video codec 12, the LCD interface 13, the camera interface 16, the multiplexing and demultiplexing module 17, the communications interface 18, the voice codec 20, the user interface control module 26 and the telephone answering device 40 are connected together via a main bus 27.

The multiplexing and demultiplexing module 17, which manages the incoming and outgoing video and audio data to and from the external communications network, is connected with the video codec 12, the communications interface 18, and the voice codec 20 via sync buses 28, 29, and 30, respectively. The main controller 10 includes a CPU, a ROM, a RAM, and so on. The operations of the various portions of the video telephony device are under control of the main controller 10. The main controller 10 performs various functions in software according to data stored in the ROM, RAM, personalized user information database 11, and telephone answering device 40.

The personalized user information database 11 is used to store a database of information for each registered user. Each database is composed of plural records. Each record may comprise, for instance, a personal phonebook (including, e.g., a phone book memory number, a phone number, a name, various addresses and any other appropriate information such as typically found in a contact list), a personally configured graphical user interface (GUI) for display on display unit 14, and/or alerts, screensavers, call logs, buddy lists, journals, blogs, and web sites or other preferences. When retrieved, the personal phonebook may be presented to the user on the display unit 14.

The video codec 12 decodes and reproduces encoded video data, and sends the reproduced video data to the display interface 13. Furthermore, the video codec 12 encodes video data supplied from the camera 15 via the camera interface 16 and creates video data encoded in accordance with e.g., MPEG-4.

The display interface 13 converts the video data supplied from the video codec 12 into a signal form that can be processed by the display 14, and sends the converted data to the display 14. The display 14 may be, for example, a color or monochrome liquid crystal display having sufficient video displaying capabilities (such as resolution) to display video with MPEG-4, and displays a picture according to video data supplied from the display interface 13.

For example, a CCD or CMOS camera may be used as the camera 15, which picks up an image of an object, creates video data, and sends it to the camera interface 16. The camera interface 16 receives the video data from the camera 15, converts the data into a form that can be processed by the video codec 12, and supplies the data to the codec 12.

The multiplexing and demultiplexing module 17 is responsible for managing the incoming and outgoing video and audio data to and from the external communications network via communications interface 18. Specifically, multiplexing and demultiplexing module multiplexes encoded video data supplied from the video codec 12 via the sync bus 28, the encoded audio data supplied from the voice codec 20 via the sync bus 30, and other data supplied from the main controller 10 via the main bus by a given method (e.g., H.221). The multiplexing and demultiplexing module 17 supplies the multiplexed data as transmitted data to the communications interface 18 via the sync bus 29.

The multiplexing and demultiplexing module 17 demultiplexes encoded video data, encoded audio data, and other data from the transmitted data supplied from the communications interface 18 via the sync bus 29. The multiplexing and demultiplexing module 17 supplies the demultiplexed data to the video codec 12, the voice codec 20, and the main controller 10, respectively, via the sync buses 28, 30, and the main bus 27.

The communications interface 18 is used to make a connection to the external communications network, which, as previously mentioned, may be any suitable network such as, but not limited to, a wireless network, a conventional telephone network, a data network (e.g., the Internet), and a cable modem system. The communications interface 18 makes various calls for communications via the communications network and sends and receives voice and video data via communications paths established in the network.

The voice codec 20 digitizes analog audio signal applied via the microphone 21 and the microphone interface. The codec 20 encodes the signal by a given audio encoding method such as ADPCM to create encoded audio data, and sends the encoded audio data to the multiplexing and demultiplexing module 17 via the sync bus 30. The voice codec 20 also decodes the encoded audio data supplied from the multiplexing and demultiplexing module 17 into an analog audio signal, which is supplied to the speaker interface 23.

The microphone 21 converts sound from the surroundings into an audio signal and supplies it to the microphone interface 22, which in turn converts the audio signal supplied from the microphone 21 into a signal form that can be processed by the voice codec 20 and supplies it to the voice codec 20.

The speaker interface 23 converts the audio signal supplied from the voice codec 20 into a signal form capable of being processed by the speaker 24, and supplies the converted signal to the speaker 24. The speaker 24 converts the audio signal supplied from the speaker interface 23 into an audible signal at an increased level.

The user interface 25 receives various instructions from the user which are to be applied to the main controller 10. The user interface 25 has control buttons for specifying various functions, push buttons for entering phone numbers and various numerical values, and a power switch for turning on and off the operation of the present terminal. The user interface 25 may also include softkeys whose functions vary depending on the context in which they are being used. The user interface control module 26 recognizes the contents of an instruction entered from the user interface 25 and informs the main controller 10 of the contents of the instruction. Instead of (or in addition to) physical buttons, the user interface may include a touch screen for entering data. In some cases the users may also enter data verbally through various voice prompt menus that may be included with the user interface 25.

The telephone answering device 40 answers a call after a predetermined number of rings that may be user selectable. The telephone answering device 40 includes a voice recorder/playback module 42 for playing an outgoing message to the caller. After the outgoing message is played, the caller may leave a voice message that is stored in voice message memory 44. The user interface 25 allows the user to select various modes of operation of the telephone answering device, including the assignment of different voice mailboxes to ensure the privacy of different users. While the voice message is being left by the caller, the voice codec 20 supplies the audio signal to the speaker interface 23, which converts the audio signal 20 into a signal form capable of being processed by the speaker 24, and supplies the converted signal to the speaker 24. The speaker 24, in turn, converts the audio signal supplied from the speaker interface 23 into an audible signal at an increased level. As a result, the voice message is made audible while it is being recorded.

The caller ID unit 34 receives caller ID information from the multiplexing and demultiplexing module 17. The caller ID information may be presented on a dedicated display associated with the caller ID unit 34 or it may be presented on the display 14. If image data is included with the caller ID information, it will generally be presented on the display 14, even if the user name and phone number is presented on a separate display.

Figure 2:
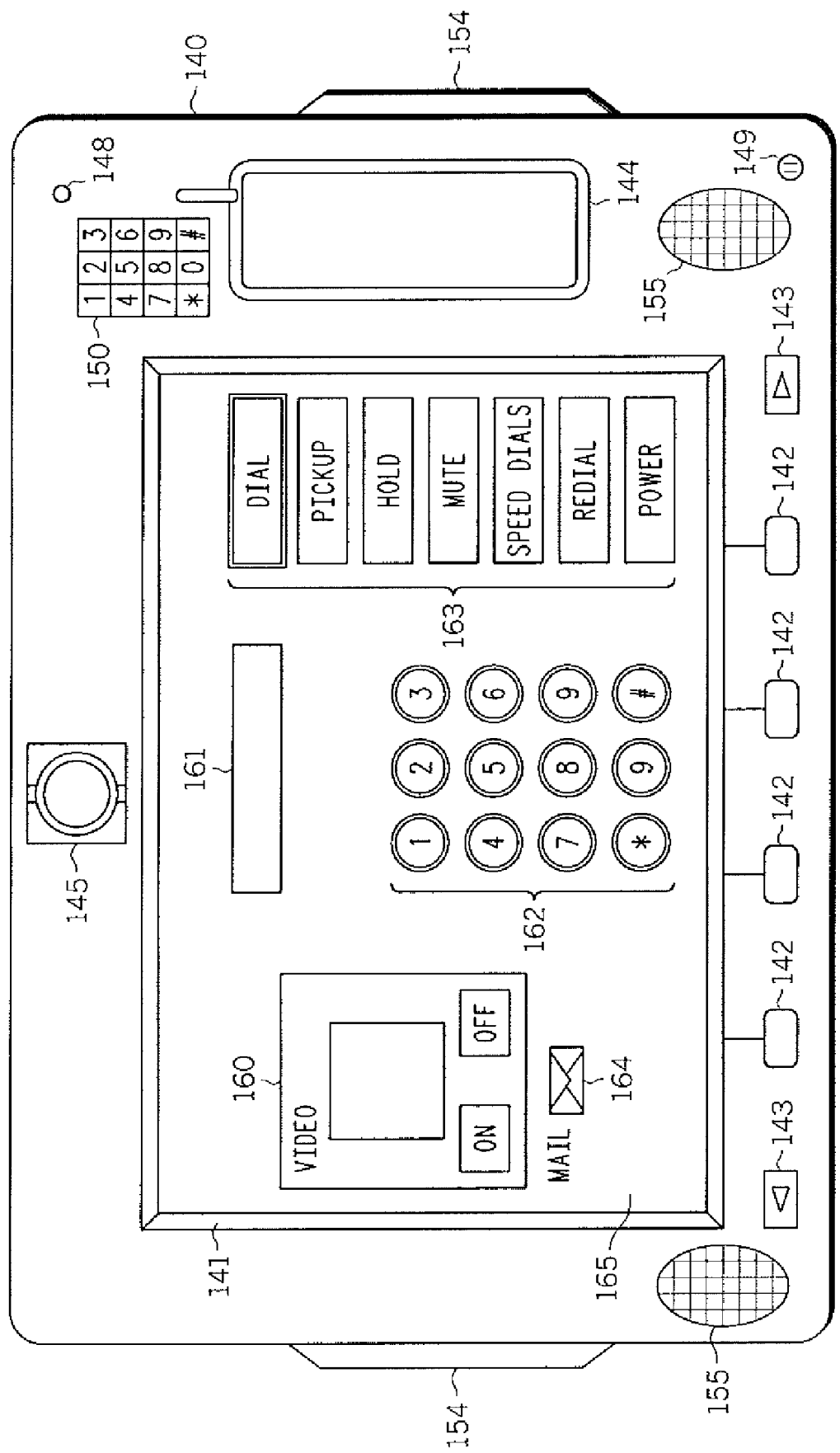
FIG. 2 shows one example of a physical implementation of the video telephony device in accordance with an embodiment of the invention.

One example of a physical implementation of the video telephony device 100 in accordance with an embodiment of the invention is shown in FIG. 2. As shown, the video telephony device 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the video telephony device 130. The function of each soft key may be displayed next to the key on the display 141. The functions of the soft keys 142 may also be manually changed by the user by pressing scroll buttons 143. The video telephony device 140 may also include a handset 144 (which may be connected via a cord or wireless connection to the rest of the video telephony device), a keypad 150, a video camera 145, a microphone 149, a motion and/or light detector 148, built-in speaker(s) 155, and/or external speakers 154 (e.g., stereo speakers). Any or all of the above-mentioned items may be integrated with the video telephony device itself or may be physically separate from the video telephony device.

When the video telephony device 130 receives video information, the display 141 may include one or more video window(s) 160 for viewing, for instance, a person to whom a user is speaking and/or showing the picture seen by the person on the other end of the video telephony device. The display may also include a dialed-telephone-number window 161 for displaying the phone number dialed, a virtual keypad 162, virtual buttons 163 for performing various telephone functions, a menu icon 165 for setting various features of the phone and a mail icon 164. Any or all of these items may be displayed as virtual buttons and/or graphic icons and may be arranged in any combination.

The manner in which caller ID information is delivered to the video telephony device 100 depends on the telephony platform and protocols that are employed. For instance, in the context of POTS, the caller ID information is provided by the Signaling System No. 7 (SS7), which is a global standard for telecommunications and defines the procedures and protocol by which network elements in the PSTN exchange information (including caller ID) over the telephone network for call set up, routing, and control. In some cases SS7 can be used to provide an enhanced set of call ID features such as images. The basic caller ID information, such as the calling party's name and number, can be presented in the conventional manner, while enhanced caller ID information may be displayed on the video telephony device's display. On the other hand, in the context of Internet telephony, the most prevalent signaling protocol is the Session Initiation Protocol (SIP).

SIP provides a standards-based mechanism for initiating, modifying, maintaining, and terminating interactive multimedia communications sessions over packet networks. SIP is typically used to establish and maintain an end-to-end session for media such as audio, video, and messaging. SIP typically operates at the beginning of a media transmission session as a preliminary setup phase—a dialog of messages is exchanged between a caller and called party. The SIP setup portion establishes policies for the media session, typically including the type of media for the session (audio, video, etc.), the relationships between media (for example, that the audio is synchronized with the video), the transport protocol for the media, and the network protocol for the media. SIP also establishes such session properties as destination, compression algorithms and parameters, and quality-of-service determinations to trade off cost, bandwidth, quality, packet loss rates, latency, and similar characteristics. In most cases, a caller and called party must agree on these session policies during SIP setup if the media are to be successfully transmitted. After the session is established, the media are typically transmitted by another protocol.

Among its other capabilities, SIP supports the exchange of early media. Early media is audio or vide data that is exchanged between the caller and the called party during call setup, before the call is established. It is often used to provide ringback tones and caller ID information, including, for instance, the calling party's name and number and one or more images received from the video telephony device. Other Internet telephony protocols support early media as well.

Figure 3:
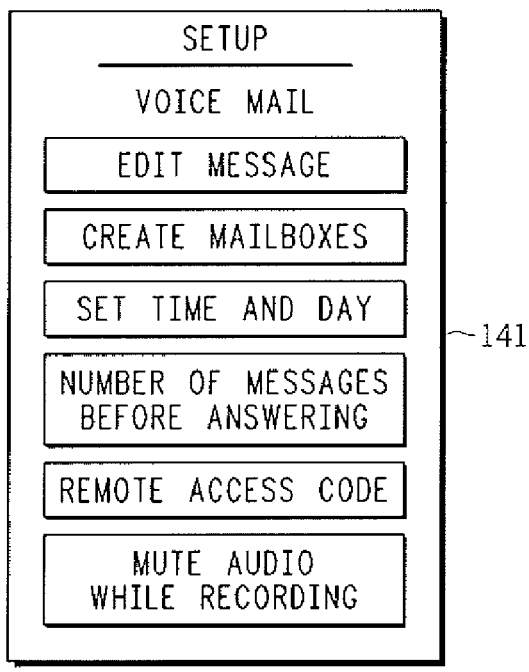
FIG. 3 shows a menu on a touch screen display of video telephony device depicting various user-selectable options available to the user concerning the voice mail capabilities of the video telephony device in accordance with an embodiment of the invention.

As previously mentioned, the voice message that is rendered while it is being recorded can be intrusive to individuals who are in the vicinity of the video telephony device while the message is being received. In addition, the rendering of the message at this time is unnecessary if the user wishes to perform call screening since the caller ID information, particularly the image received from the caller, is still available. Accordingly, the user is provided with the option to mute the incoming voice message so that it is not rendered while it is being recorded. The user can activate or deactivate this feature through the user interface 25. For example, FIG. 3 shows a touch screen display (e.g., touch screen display 141 in FIG. 2) after the user has selected a particular setup sub-menu from a menu icon (e.g., menu icon 165 in FIG. 3) in accordance with an embodiment of the invention. The illustrated sub-menu depicts various user-selectable options available to the user concerning the voice mail capabilities of the video telephony device. As shown, the options allow the user to control such features as editing the outgoing message played to a caller, creating individual user mailboxes, setting the number of rings before the telephone answering device responds to an incoming call, and so on. In addition, the user is provided with the option to mute the speaker so that a message being recorded by the telephone answering device is not made audible while the message is being recorded. In some cases this option will only mute the message if an image is received along with the caller ID information. In other cases the user may be provided with a further option that allows the user to determine if the message should be muted if no image is received along with the caller ID information.

If the user decides to mute the audio when an incoming message is being recorded by a telephone answering device, a variety of further options may be made available to the user. For instance, the user may choose to only mute the audio for selected callers that are included the personal phonebook stored in the video telephony device. Conversely, the user may choose to only mute the audio for all callers except selected callers that are included the person phonebook stored in the video telephony device. In either case, when a call is received the video telephony device compares the caller ID information received with the call to the information stored in the personal phonebook in order to determine if the audio should be muted. In this way the mute setting option may be activated on a caller by caller basis. As another example, the user may be given the option to mute the audio for selected times of day. For instance, users may wish to mute the audio during the dinner hour or overnight during those hours when people are sleeping.

When a caller is leaving a voice message and the audio has been muted, in some cases the video telephony device may present the user with the option to deactivate the mute function so that the caller's message becomes audible. In this way the user can listen to the remainder of the caller's message if he or she so desires.

Figure 4:
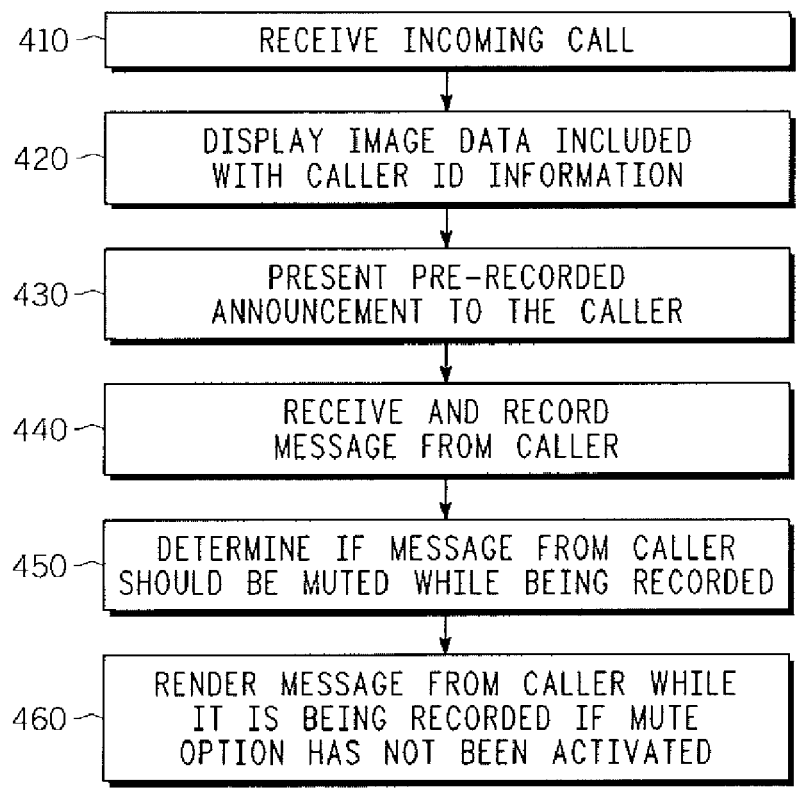
FIG. 4 is flowchart showing one example of a method for responding to an incoming call in accordance with an embodiment of the invention.

FIG. 4 is flowchart showing one example of a method for responding to an incoming call in accordance with an embodiment of the invention. The method begins in step 410 when a video telephony device receives an incoming call from a caller. The incoming call includes caller ID information having image data associated with the caller included therein. In step 420 the image data is displayed on the display of the telephony device while the device is audibly announcing receipt of the incoming call. The audible announcement may be a series of rings. A communication session is established with the caller in step 430 by presenting a pre-recorded announcement to the caller. The pre-recorded announcement will generally indicate that the called party is not available and request the caller to leave a voice message. In response to the pre-recorded announcement, a message from the caller is received and recorded in step 440. In step 450 the video telephony device determines if the message from the caller should be muted while it is being recorded. This may be accomplished by comparing the caller ID information to the list of the contacts included in the phonebook stored in the video telephony device. The message is rendered in step 460 while it is being recorded only if a user-selectable mute setting option has not been activated for this caller.

Among its other advantages, the system and techniques described herein offer a degree of privacy since it is possible to see who is calling without exactly knowing the content of the message they are leaving. This may be useful to parents, for instance, who may not want their children to hear messages that are inappropriate for them.

The process shown in FIG. 4 may be implemented in a general, multi-purpose or single purpose processor. Such a processor will execute instructions, either at the assembly, compiled or machine-level, to perform that process. Those instructions can be written by one of ordinary skill in the art following the description of FIG. 4 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A method of responding to an incoming call, comprising:
   receiving the incoming call from a caller, the incoming call including caller ID information having image data associated with the caller included therein;
   displaying the image data on a video telephony device display while audibly announcing receipt of the incoming call;
   establishing a communication session with the caller by presenting a pre-recorded announcement to the caller;
   in response to the pre-recorded announcement, receiving and recording a message from the caller; and rendering the message while it is being recorded only if a user-selectable mute setting option has not been activated.

2. The method of claim 1 wherein the mute setting option is activatable by the user on a caller by caller basis and further comprising determining if the caller is included in a directory of callers and, if so, determining if the mute setting option is activated for the caller.

3. The method of claim 1 wherein the mute setting option is activatable by the user for all incoming calls regardless of caller identity.

4. The method of claim 1 wherein the mute setting option is activatable by the user for selected times of day.

5. The method of claim 1 wherein, if the mute setting option is activated, further comprising presenting an option to deactivate the mute setting option while the message is being recorded.

6. The method of claim 1 wherein the caller ID information is received as early media.

7. The method of claim 6 wherein the early media is received in accordance with a Session Initiation Protocol (SIP).

8. A video telephony device, comprising:
an external communications interface for communicating information over an external communications network;
a display for presenting image data received over the external communications network;
a speaker for rendering audio information received over the external communications network;
a telephone answering device for responding to an incoming call by presenting a pre-recorded announcement to a caller and recording a message from the caller;
a user interface, the user interface including a menu of user-selectable settings, the user-selectable settings including a mute option to prevent the speaker from rendering the message from the caller while it is being recorded by the telephone answering device; and
a database configured to store the user-selectable settings chosen by a user; and
a processor operatively associated with the external communications interface, the display, the speaker, the telephone answering device, the user interface and the database.

9. The video telephony device of claim 8 further comprising a caller ID unit for receiving caller ID information, the caller ID information including image data associated with the caller for presentation on the display before a call session is established.

10. The video telephony device of claim 9 wherein the mute option prevents the speaker from rendering the message only if the caller ID image information is available.

11. The video telephony device of claim 9 further comprising a second database configured to store phone directory of contacts, wherein the mute option is activatable by a user on a caller by caller basis for those callers included in the second directory.

12. The video telephony device of claim 8 wherein the mute option is activatable by the user for selected times of day.

13. The video telephony device of claim 8 wherein the user-selectable settings further include a second option to deactivate the mute option while the message is being recorded.

14. The video telephony device of claim 9 wherein the caller ID unit is configured to receive the caller ID information as early media.

15. The video telephony device of claim 14 wherein the early media is received in accordance with a Session Initiation Protocol (SIP).

16. At least one non-transitory computer-readable medium encoded with instructions which, when executed by a processor, performs a method comprising:
presenting a menu of user-selectable settings associated with operating features of a video telephony device, the user-selectable settings including a mute option to prevent a speaker associated with the video telephony device from rendering the message from the caller while it is being recorded by a telephone answering device if caller ID image information is available for rendering on a display; and
receiving user input activating the mute option.

17. The computer-readable medium of claim 16 further comprising receiving user input activating the mute option for all but selected individuals included in a phone directory associated with the video telephony device.

18. The computer-readable medium of claim 16 further comprising receiving user input activating the mute option for selected times of day.

19. The computer-readable medium of claim 16 further comprising:
receiving an incoming call that includes caller ID image information;
displaying the caller ID image information;
muting the message from the caller while it is being recorded;
receiving user input deactivating the mute option;
rendering a remaining portion of the message from the caller while it is being recorded.

* * * * *